UNITED STATES PATENT OFFICE.

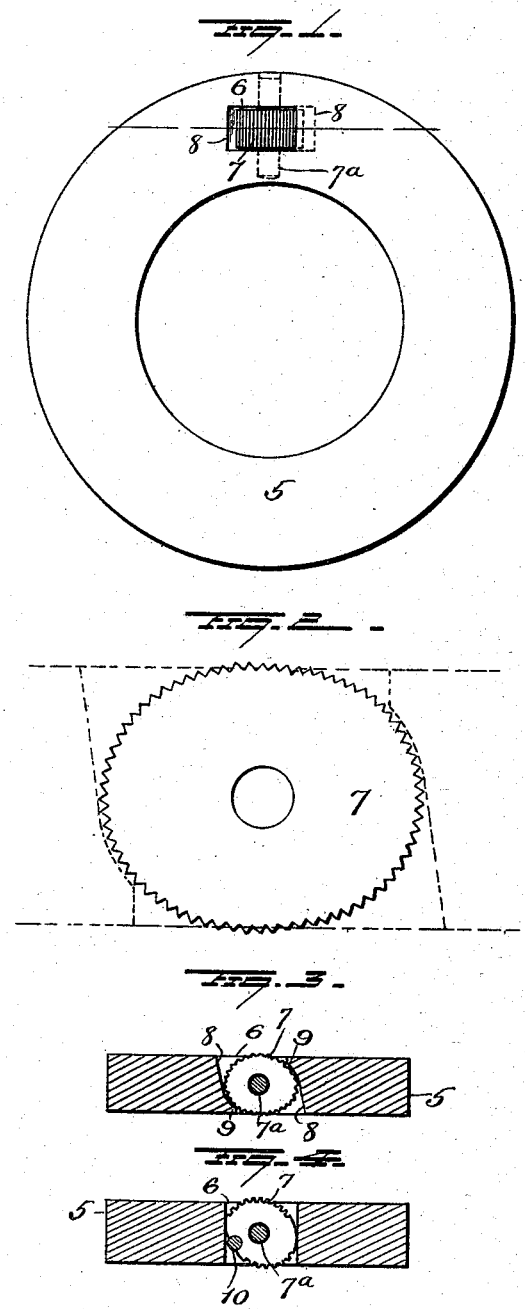

BENJAMIN E. D. STAFFORD AND ETHAN I. DODDS, OF PITTSBURGH, PENNSYLVANIA, ASSIGNORS TO FLANNERY BOLT COMPANY, OF PITTSBURGH, PENNSYLVANIA.

LOCK-WASHER FOR NUTS.

1,216,620.   Specification of Letters Patent.   Patented Feb. 20, 1917.

Application filed February 18, 1916. Serial No. 79,125.

*To all whom it may concern:*

Be it known that we, BENJAMIN E. D. STAFFORD and ETHAN I. DODDS, citizens of the United States, and residents of Pittsburgh, in the county of Allegheny and State of Pennsylvania, have invented certain new and useful Improvements in Lock-Washers for Nuts; and we do hereby declare the following to be a full, clear, and exact description of the invention, such as will enable others skilled in the art to which it appertains to make and use the same.

Our invention relates to an improvement in lock washers for nuts, and it consists in the details of construction as will be more fully explained and pointed out in the claims.

In the accompanying drawings, Figure 1 is a view in plan of a washer embodying our invention; Fig. 2 is an enlarged view in elevation of the elliptical clamping roller; Fig. 3 is a view in section of the washer showing the roller in place therein and Fig. 4 is a similar view of a modification.

5 represents a washer having a central opening for the passage of a bolt, and provided with a rectangular opening 6 for the clamping roller 7.

The clamping roller 7 is in the form of an ellipse and is mounted on the pin 7ª passing radially through the washer at one side of the latter. Its shortest diameter is slightly greater than the thickness of the washer 5, so that when turned with its longest diameter in the plane of the washer, its shortest diameter will project slightly at each side of the washer to engage the nut and the fish plate or other part against which the washer rests when in use. By this construction it will be seen that when the washer with our improved clamping roller is between a nut and fish plate or other part, the projecting teeth or roughened edges of the roller will engage both the rear face of the nut and the adjacent face of the fish plate. As shown in Fig. 3, the end walls of the opening 6 in washer 5 are slightly inclined as at 8, from one end to a point near the other end, where it bends or inclines more abruptly toward the roller and rests in the path of movement of the long ends of the latter thus forming stops 9 which limit the rotation of the roller. These stops 9 in the end walls of the opening 6, are diagonally disposed, that is to say, one is on one end wall near one face of the washer, and the other is on the other end wall adjacent the other face of the washer and operate to limit the rotation of the roller in one direction.

The stops are so disposed on the washer that the movement of the nut when being screwed onto a bolt will tend to turn the roller and hold its longer ends in contact with the stops or seats 9, while a reverse rotation of the nut, as in unscrewing, will cause the roller to turn and bear against the nut with gradually increasing force. As the longer ends of the elliptical roller move outwardly through the opening 6, one end thereof will be in contact with the fish plate or other part and the other end in contact with the inner face of the nut, hence a continued unscrewing movement of the nut, and the resultant turning of the roller, tends to move the side of the washer carrying the roller away from the fish plate and toward the nut, while the part of the roller bearing against the nut engages the latter with increasing pressure due to the movement of the washer and the turning of the roller on its axis and absolutely prevents a nut that has been screwed home on its bolt, from working loose.

Normally the roughened faces project only slightly beyond the faces of the washer, but sufficiently to engage or bite the faces of the fish plate and nut when the latter is screwed home, and as the roller is free to turn in the direction of unscrewing turning movement of the nut, it follows that after a nut has been once locked, all chances of accidental movement of the nut is overcome.

By making the roller or gripping member elliptical, it engages the nut and fish plate in unscrewing movement of the nut with a gradually increasing pressure and a constantly changing biting surface, due to cam shape of the roller. As the roller bears on the fish plate or other fixed object, and against the rear face of the nut, a very slight movement of the nut is sufficient to turn the roller to a position where the nut cannot be removed except by the application of sufficient pressure, as for instance where the nut must be removed, to crush the roller.

If desired however we may provide the washer with a pin hole 10, shown in Fig. 4 through which a pin may be inserted to engage the roller and lock the same against turning movement.

Having fully described our invention what we claim as new and desire to secure by Letters-Patent, is:—

1. A lock washer having an opening through the same, and an elliptical roller having a roughened face and mounted in said opening, the shortest diameter of said roller being slightly greater than the thickness of the washer so as to project beyond both faces of the washer when the roller is in its normal unlocking position.

2. A lock washer having an opening through the same and diagonally disposed stops on the end walls of said opening and an elliptical roller mounted in said opening and adapted to be limited in its turning movement by contact with said stops, the shortest diameter of said roller being slightly greater than the thickness of the washer so as to project beyond both faces of the washer when the roller is in its normal unlocking position.

In testimony whereof, we have signed this specification in the presence of two subscribing witnesses.

BENJAMIN E. D. STAFFORD.
ETHAN I. DODDS.

Witnesses:
 EDWIN S. RYCE,
 F. H. ALLISON.

Copies of this patent may be obtained for five cents each, by addressing the "Commissioner of Patents, Washington, D. C."